US009338371B2

(12) United States Patent
Sano et al.

(10) Patent No.: US 9,338,371 B2
(45) Date of Patent: May 10, 2016

(54) IMAGING DEVICE

(71) Applicant: Hitachi, Ltd., Chiyoda-ku, Tokyo (JP)

(72) Inventors: Satoshi Sano, Tokyo (JP); Akihito Nishizawa, Tokyo (JP); Junji Shiokawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 297 days.

(21) Appl. No.: 14/109,939

(22) Filed: Dec. 17, 2013

(65) Prior Publication Data

US 2014/0192202 A1    Jul. 10, 2014

(30) Foreign Application Priority Data

Jan. 10, 2013    (JP) .................................. 2013-002352

(51) Int. Cl.
*H04N 5/33*    (2006.01)
*H04N 1/60*    (2006.01)

(52) U.S. Cl.
CPC ..................................... *H04N 5/332* (2013.01)

(58) Field of Classification Search
CPC ........... G06T 2207/10004; G06T 2207/10024; G06T 5/002; G06T 2207/20182; G06T 5/50; G06T 7/0012; G06T 19/006; G06T 2207/10016; G06T 2207/10068; G06T 2207/10152; G06T 2207/30252; G06T 5/003; G06T 5/01; H04N 5/33; H04N 5/332; H04N 3/09; G01J 5/02; G01J 2005/0077
See application file for complete search history.

(56) References Cited

U.S. PATENT DOCUMENTS

| 8,054,346 | B2 | 11/2011 | Numata |  |
|---|---|---|---|---|
| 2003/0231347 | A1* | 12/2003 | Imai | ..................... H04N 1/4074 358/2.1 |
| 2007/0201738 | A1* | 8/2007 | Toda | ..................... H04N 9/045 382/144 |
| 2008/0087800 | A1* | 4/2008 | Toda | ................. H01L 27/14603 250/214 C |
| 2009/0323093 | A1* | 12/2009 | On | .......................... G06T 5/009 358/1.9 |

(Continued)

FOREIGN PATENT DOCUMENTS

CN    101309360 A    11/2008
JP    2002-171519 A    6/2002

OTHER PUBLICATIONS

Office Action for correspondina Chinese Application No. 20130684621.1 (issued Jan. 19, 2016).

*Primary Examiner* — Sath V Perungavoor
*Assistant Examiner* — Howard D Brown, Jr.
(74) *Attorney, Agent, or Firm* — Miles & Stockbridge P.C.

(57) ABSTRACT

An imaging unit photographs an object, and obtains a visible light signal and an invisible light signal. A visible light luminance extraction unit extracts a visible light luminance signal. An invisible light luminance extraction unit extracts an invisible light luminance signal. A color signal extraction unit extracts color signals from the visible light signal and corrects the color signals. An image synthesis unit uses the visible light luminance signal and the invisible light luminance signal to synthesize a luminance signal and generates a color image using the synthesized luminance signal and the corrected color signals. In accordance with the value of the visible light luminance signal, the control unit controls a synthesis ratio between the visible and invisible light luminance signals, a gain for the color signals to be corrected in the color signal extraction unit, and color noise removal to be performed in the color signal extraction unit.

8 Claims, 12 Drawing Sheets

(56) References Cited

U.S. PATENT DOCUMENTS

| | | | |
|---|---|---|---|
| 2010/0019151 A1* | 1/2010 | Shimizu | B60R 1/00 250/330 |
| 2010/0110180 A1* | 5/2010 | Tonogai | G06T 5/50 348/136 |
| 2010/0208071 A1* | 8/2010 | Takahashi | G06T 7/0081 348/148 |
| 2011/0317936 A1* | 12/2011 | Takamura | G06T 5/008 382/274 |
| 2012/0002074 A1* | 1/2012 | Baba | H04N 5/235 348/228.1 |
| 2013/0229513 A1* | 9/2013 | Ichitani | G02B 27/1066 348/135 |
| 2013/0229526 A1* | 9/2013 | Matsuno | H04N 5/332 348/164 |

* cited by examiner

F I G . 1
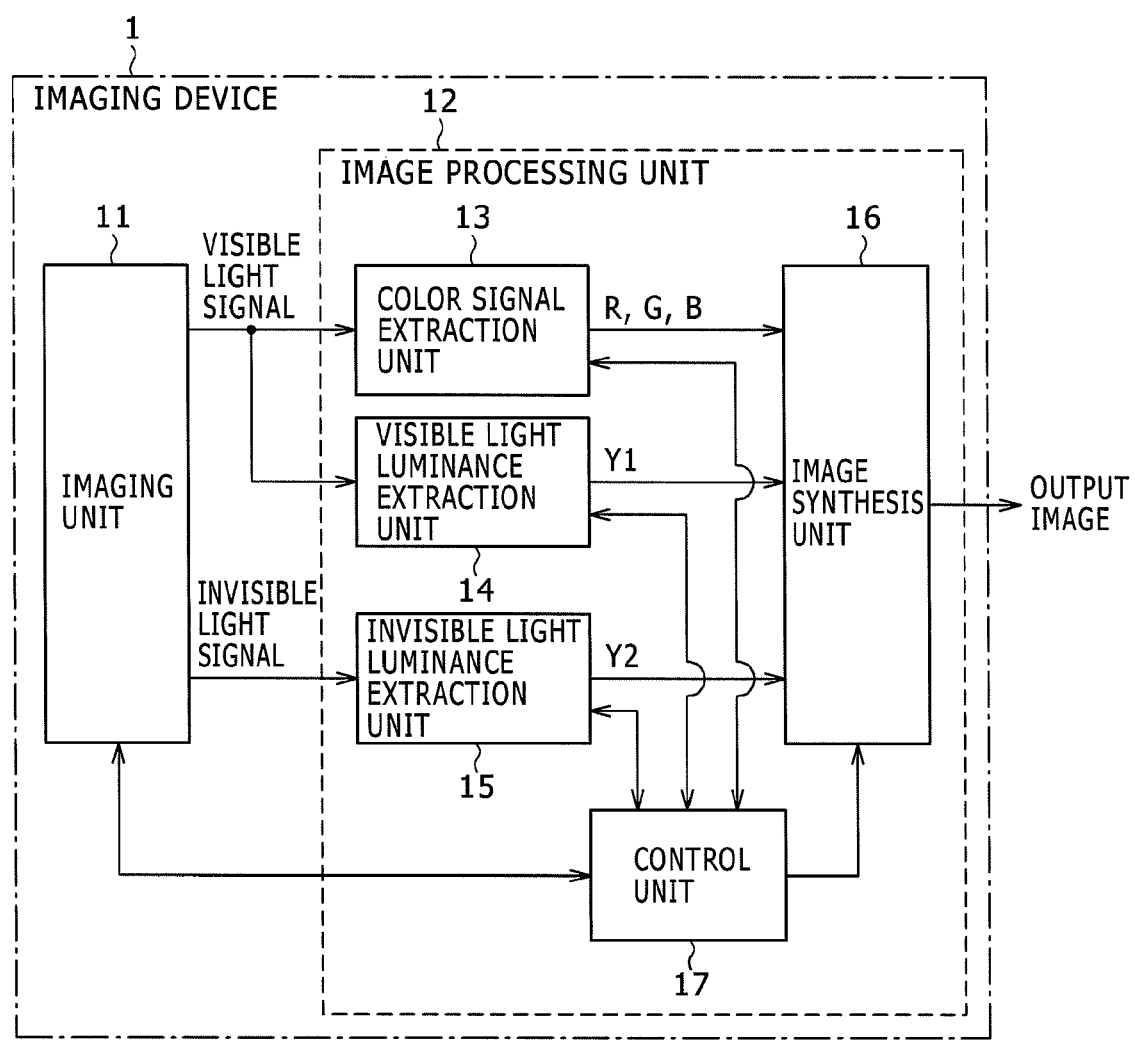

IMAGING PIXELS 24

FIG.11A

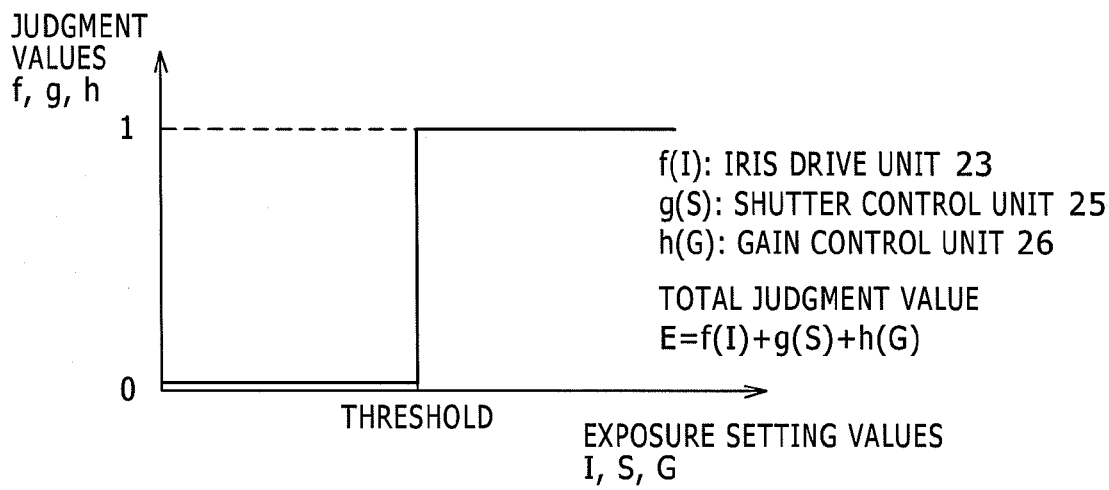

JUDGMENT VALUES f, g, h f(I): IRIS DRIVE UNIT 23
g(S): SHUTTER CONTROL UNIT 25
h(G): GAIN CONTROL UNIT 26

TOTAL JUDGMENT VALUE
E=f(I)+g(S)+h(G)

EXPOSURE SETTING VALUES I, S, G

FIG.11B

| ILLUMINANCE ENVIRONMENT | TOTAL JUDGMENT VALUE OF EXPOSURE SETTING E=f+g+h | LUMINANCE SYNTHESIS RATIO Y1:Y2=k1:k2 | COLOR SIGNAL CORRECTION R, G, B→R', G', B' |
|---|---|---|---|
| FOR HIGH ILLUMINANCE (HIGHER LUMINANCE Y1) ↕ FOR LOW ILLUMINANCE (LOWER LUMINANCE Y1) | 0 | 1:0 | NOT PERFORMED |
| | 1 | 0.7:0.3 | NOT PERFORMED |
| | 2 | 0.3:0.7 | PERFORMED |
| | 3 | 0:1 | PERFORMED |

IMAGING DEVICE

CROSS-REFERENCE TO RELATED APPLICATION

This application claims the priority of Japanese Patent Application No. 2013-002352 filed Jan. 10, 2013, which is incorporated herein by reference in its entirety.

BACKGROUND

The present invention relates to an imaging device that generates a color image with the use of visible light and invisible light (such as near-infrared light).

An image generation technique that uses infrared light has been proposed for color image photographing in a low illuminance environment. For example, Japanese Unexamined Patent Application Publication No. 2002-171519 discloses an infrared color image formation device that includes: an infrared camera that receives infrared light emitted or reflected from a target, and obtains an infrared spectral image; a storage device that memorizes in advance the relationship data between colors and infrared spectral emission intensities or infrared spectral reflection coefficients regarding the target; a first processing means that determines a color in each position of the infrared spectral image with the use of the infrared spectral emission intensity or the infrared spectral reflection coefficient in the each position of the infrared spectral image on the basis of the relationship data; and a second processing means that dyes the each position of the image of the target on the basis of color signals obtained by the first processing means.

SUMMARY

It is required that an imaging device should have a function to faithfully reproduce the color of an object that is a photographed target as a fundamental function. However, if the imaging device is, for example, a monitoring camera, it becomes difficult to correctly capture the color of the photographed object in the case where the camera is used in a low illuminance environment lacking in sufficient brightness. Even in such a low illuminance environment, it is desired that the imaging device should have a function to faithfully reproduce the color of the object.

Japanese Unexamined Patent Application Publication No. 2002-171519 discloses a method in which the color of the object is determined using the relationship data between colors and infrared spectral emission intensities or infrared spectral reflection coefficients. However, this disclosed method requires that the relationship data in the infrared spectral region should be stored in advance to determine the color of the object. In addition, because only optical reception signals in the infrared region are used to determine the color, this disclosed method is not always capable of reproducing a natural color corresponding to the color of the object in comparison with a method in which color signals obtained from a visible light signal are used. Therefore, room for improvement can be found in this disclosed method.

The present invention has been made with the above-mentioned problem in mind, and provides an imaging device capable of reproducing a more natural color of an object even in a low illuminance environment.

According to an aspect of the present invention, an imaging device includes: an imaging unit that photographs an object, receives visible light and invisible light using imaging pixels, and converts the received visible light and invisible light into a visible light signal and an invisible light signal; a visible light luminance extraction unit that extracts a visible light luminance signal Y1 from the visible light signal; an invisible light luminance extraction unit that extracts an invisible light luminance signal Y2 from the invisible light signal; a color signal extraction unit that extracts color signals from the visible light signal and that corrects the color signals as well; an image synthesis unit that synthesizes the visible light luminance signal Y1 and the invisible light luminance signal Y2 to form a synthesized luminance signal Y3 and that generates a color image using the synthesized luminance signal Y3 and the corrected color signals; and a control unit that controls the imaging unit, the color signal extraction unit, and the image synthesis unit.

Here, in accordance with the value of the visible light luminance signal Y1 extracted in the visible light luminance extraction unit, the control unit controls a synthesis ratio between the visible light luminance signal Y1 and the invisible light luminance signal Y2 used for the synthesis performed in the image synthesis unit, a gain for the color signals to be corrected in the color signal extraction unit, and color noise removal to be performed in the color signal extraction unit.

In addition, in accordance with the exposure condition of the imaging unit, the control unit controls the synthesis ratio between the visible light luminance signal Y1 and the invisible light luminance signal Y2 used for the synthesis performed in the image synthesis unit, the gain for the color signals to be corrected in the color signal extraction unit, and the color noise removal to be performed in the color signal extraction unit.

According to the aspect of the present invention, it becomes possible provide an imaging device capable of reproducing a more natural color of an object even in a low illuminance environment.

BRIEF DESCRIPTION OF THE DRAWINGS

FIG. 1 is a block diagram showing the functional configuration of an imaging device according to a first embodiment;

FIG. 11A and FIG. 11B are diagrams for concretely describing the judgment of an exposure setting values (at step S205), and luminance signal synthesis (at step S207) and color signal correction (at step S208) corresponding to the judgment.

DETAILED DESCRIPTION

Figure 2:
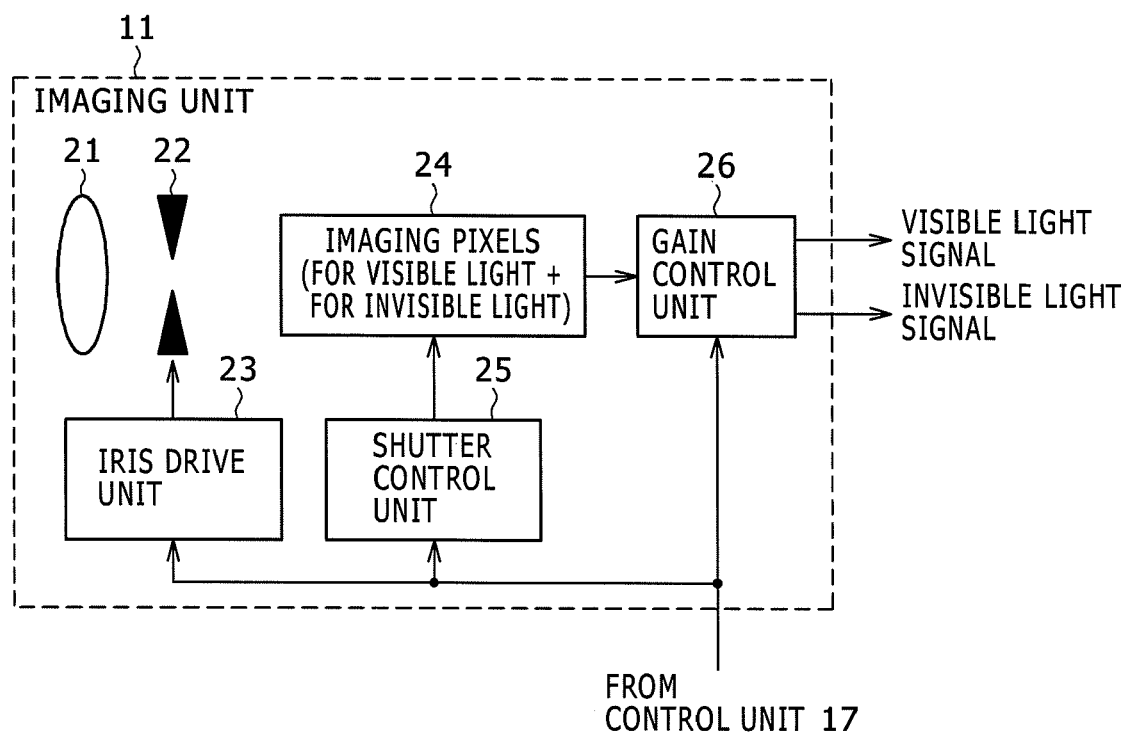
FIG. 2 is a diagram showing the internal configuration of an imaging unit.

Hereinafter, the embodiments of the present invention will be described with reference to the accompanying drawings.

First Embodiment

FIG. 1 is a block diagram showing the functional configuration of an imaging device according to a first embodiment. The imaging device 1 includes an imaging unit 11 and an image processing unit 12.

The imaging unit 11 includes imaging pixels for receiving visible light and invisible light from an object, converts the received visible light and invisible light into a visible light signal and an invisible light signal, and sends the visible light signal and the invisible light signal to an image processing unit 12. The term "visible light" as used herein means light whose wavelength resides in the wavelength band of red (R) light, green (G) light, and blue (B) light, and term "invisible light" as used herein means light whose wavelength resides in the wavelength band of infrared light and near-infrared light (IR).

The image processing unit 12 includes a color signal extraction unit 13, a visible light luminance extraction unit 14, an invisible light luminance extraction unit 15, an image synthesis unit 16, and a control unit 17.

The color signal extraction unit 13 extracts color signals R, G, and B from the visible light signal sent from the imaging unit 11. In this case, the color signal extraction unit 13 performs correction in which the input color signals R, G, and B are amplified by a predefined gain, and color noise generated at the amplification of the color signals is removed in accordance with the directions of the control unit 17.

The visible light luminance extraction unit 14 extracts a luminance signal from the visible light signal sent from the imaging unit 11. The visible light luminance signal extracted above will be referred to as a visible light luminance signal Y1 hereinafter.

The invisible light luminance extraction unit 15 picks up the value of each pixel from the invisible light signal IR sent from the imaging unit 11 as the luminance of a monochromatic image, and extracts an invisible light luminance signal Y2.

These corrected color signals R, G, and B and these two extracted luminance signals Y1 (visible light luminance signal) and Y2 (invisible light luminance signal) are sent to the image synthesis unit 16 and the control unit 17.

The image synthesis unit 16 synthesizes the visible light luminance signal Y1 and the invisible light luminance signal Y2 with a predefined ratio in accordance with the directions of the control unit 17 to form a luminance signal Y3, generates a color image using the synthesized luminance signal Y3 and the corrected color signals R, G, and B, and outputs the color image.

The control unit 17 controls the operations of the color signal extraction unit 13, the image synthesis unit 16, and the imaging unit 11 in accordance with the input visible light luminance signal Y1. The control unit 17 makes the color signal extraction unit 13 correct the color signals in accordance with the visible light luminance signal Y1. To put it concretely, the control unit 17 makes the color signal extraction unit 13 correct the visible light signal that is sent from the imaging unit 11 and to be used for color signal extraction. The control unit 17 determines a synthesis ratio between the visible light luminance signal Y1 and the invisible light luminance signal Y2 in accordance with the value of the visible light luminance signal Y1, and makes the image synthesis unit 16 synthesize the visible light luminance signal Y1 and the invisible light luminance signal Y2 with the synthesis ratio. The control unit 17 makes the imaging unit 11 change exposure setting values (an iris aperture, a shutter speed, and a signal gain) in accordance with the visible light luminance signal Y1. Conversely, the control unit 17 controls the color signal extraction unit 13 and the image synthesis unit 16 on the basis of the current illuminance environment (corresponding to the visible light luminance signal Y1) that is estimated with reference to the exposure setting values (Refer to a second embodiment).

Thanks to the above described configuration, the synthesis can be performed on the visible light luminance signal Y1 extracted from the visible signal and the invisible light luminance signal Y2 extracted from the invisible signal with an appropriate ratio between the visible light luminance signal Y1 and the invisible light luminance signal Y2 in accordance with the illuminance environment at the time of photographing, which generates a luminance signal that provides good visibility. In addition, in an environment whose illuminance is not sufficient so that the color signals are too small to generate a color image, the control unit 17 makes the color signal extraction unit 13 appropriately amplify the color signals extracted from the visible signal. Subsequently, with the use of a combination of the synthesized luminance signal Y3 and the corrected color signals, the color image of an object with a more natural color can be generated.

Hereinafter, the configuration and operation of each unit will be described in detail.

FIG. 2 is a diagram showing the internal configuration of the imaging unit 11.

The imaging unit 11 includes: a lens 21 for condensing the light from an object; an iris 22 for adjusting the input amount of the light; an iris drive unit 23 for adjusting the iris aperture of the iris 22; imaging pixels 24 for receiving visible light and invisible light and converting these pieces of light into electric signals; a shutter control unit 25 for controlling the shutter speed (exposure time) for the imaging pixels; and a gain control unit 26 for amplifying the signals obtained by the imaging pixels. The imaging pixels 24 include visible light pixels and invisible light pixels, and the gain control unit 26 outputs a visible light signal and an invisible light signal.

The iris drive unit 23, the shutter control unit 25, and the gain control unit 26, which set the exposure condition at the time of photographing, are controlled by the control unit 17, and when any of the setting values of the iris drive unit 23, the shutter control unit 25, and the gain control unit 26 is changed, the unit corresponding to the changed setting value sends its setting value to the control unit 17. When the illuminance is low, that is, when the visible light luminance signal Y1 is small, the control unit 17 changes the exposure setting values of the iris drive unit 23, the shutter control unit 25, and the gain control unit 26 of the imaging unit 11 so that the visible light signal is amplified and color signals necessary for photographing are secured.

Figure 3:
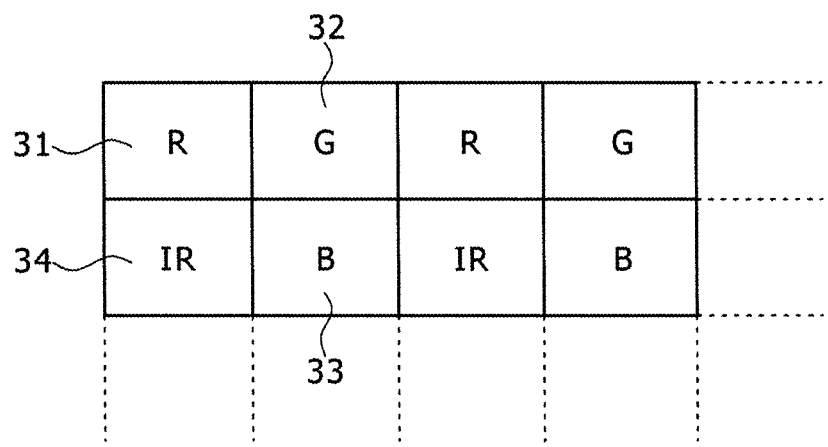
FIG. 3 is a diagram showing a configuration example of imaging pixels of the imaging unit.

FIG. 3 is a diagram showing a configuration example of the imaging pixels 24 of the imaging unit 11. The imaging pixels 24 have visible pixels and invisible pixels disposed on a common element alignment surface. The imaging pixels 24 have a pixel 31 with its sensitivity reacting mainly to R light; a pixel 32 with its sensitivity reacting mainly to G light; a pixel 33 with its sensitivity reacting mainly to B light as the visible pixels; and further have a pixel 34 with its sensitivity reacting mainly to near-infrared light IR as the invisible pixel. These pixels are repeatedly disposed on the element alignment surface.

Figure 4:
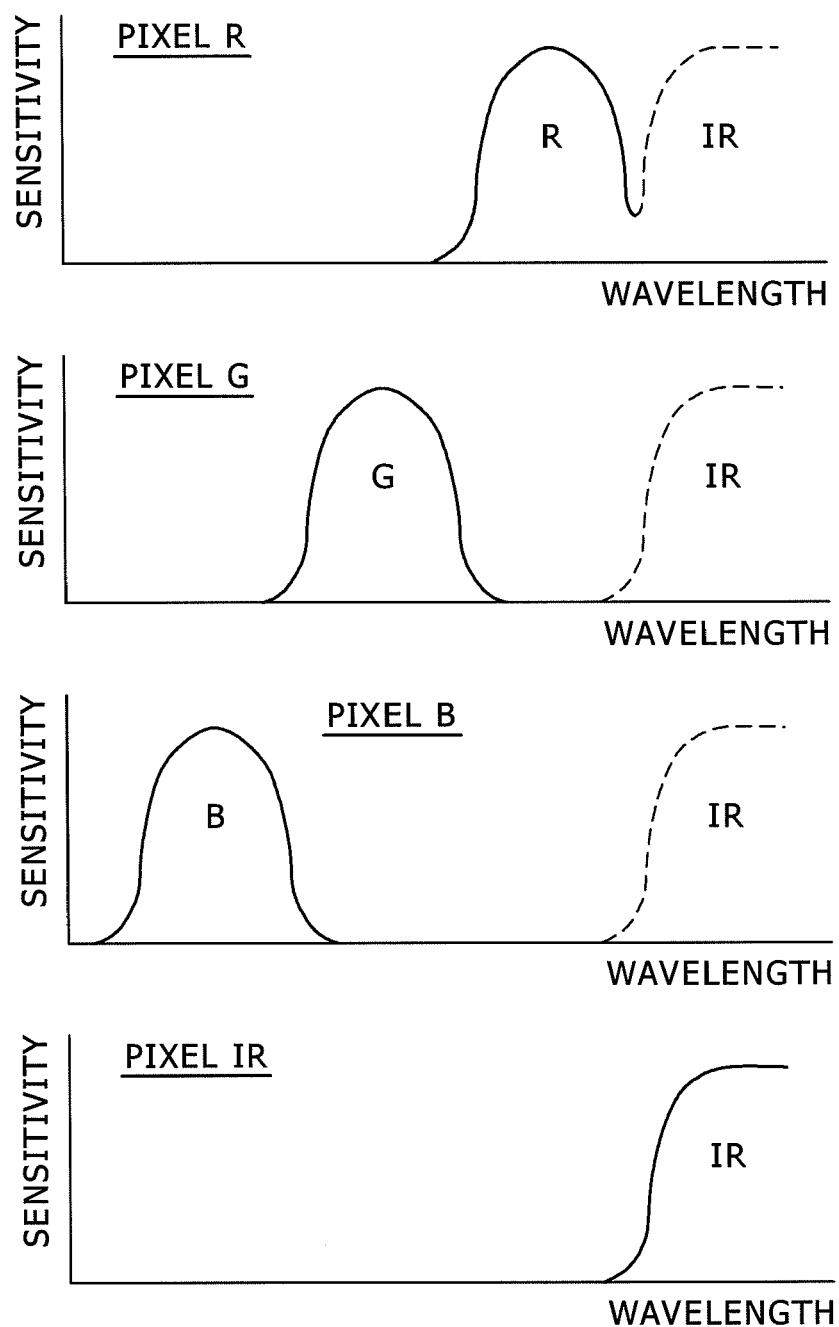
FIG. 4 is a diagram showing sensitivity vs. light wavelength characteristics for imaging pixels.

FIG. 4 is a diagram showing sensitivity vs. light wavelength characteristics, that is, spectral sensitivity characteristics, for respective pixels 31 to 34. The sensitivity characteristics of pixels R, G, and B have respectively sensitivities reacting to the wavelength region of the near-infrared light IR in addition to sensitivities reacting to their respective wavelength regions of the R, G, and B visible lights. These characteristics are characteristics of imaging pixels used for typical visible light camera, and optical filters (not shown) are inserted in front of respective pixels R, G, and B to remove the IR light component. The pixel IR has a sensitivity reacting only to the near-infrared light IR. As a result, color signals and a luminance signal in the visible light region are obtained from the pixels R, G, and B, while a luminance signal in the invisible light region is obtained from the pixel IR.

Figure 5:
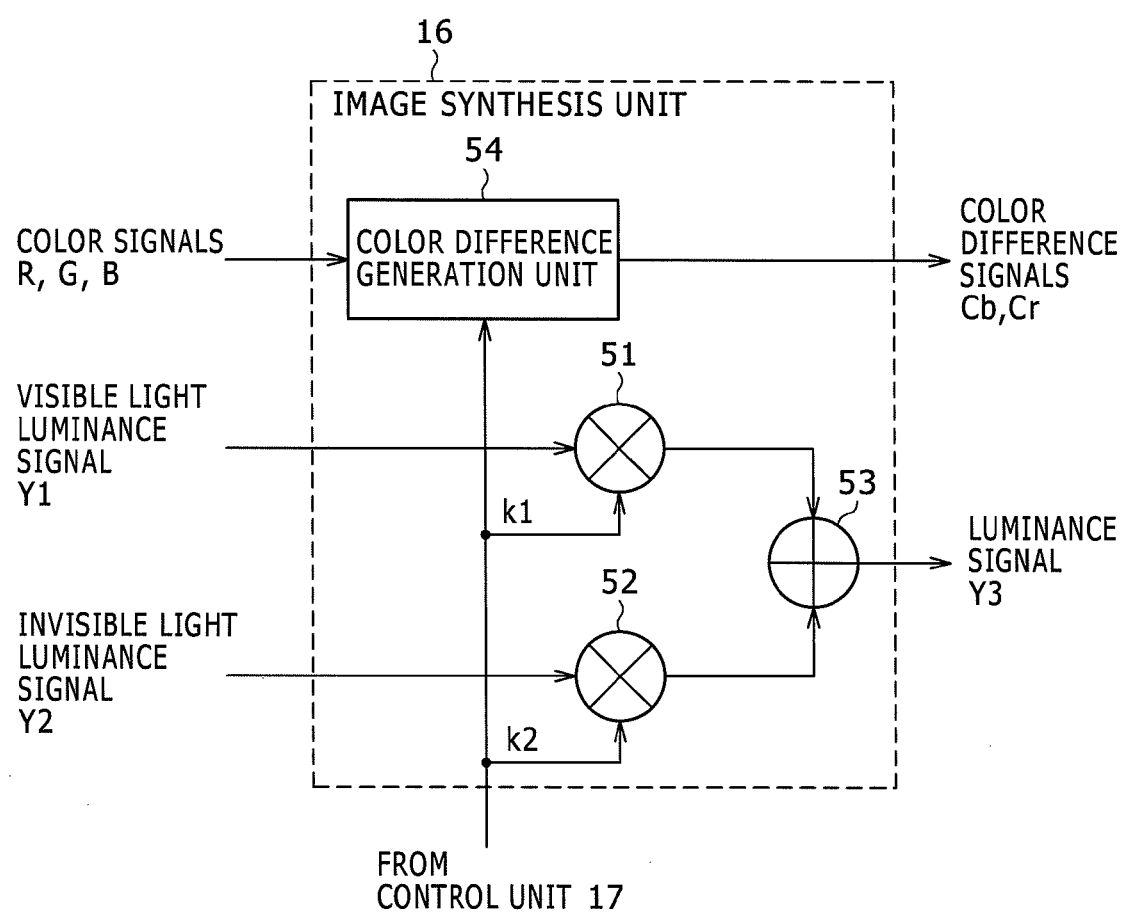
FIG. 5 is a diagram showing the internal configuration of an image synthesis unit.

FIG. 5 is a diagram showing the internal configuration of the image synthesis unit 16. In the image synthesis unit 16, the visible light luminance signal Y1 sent from the visible light luminance extraction unit 14 and the invisible light luminance signal Y2 sent from the invisible light luminance extraction unit are synthesized. The synthesis ratio (k1:k2) between the visible light luminance signal Y1 and the invisible light luminance signal Y2 is given by the directions of the control unit 17, and k1 and k2 are respectively set as the coefficients k1 and k2 of multipliers 51 and 52, and the visible light luminance signal Y1 and the invisible light luminance signal Y2 are respectively multiplied by the coefficients k1 and k2. The visible light luminance signal Y1 multiplied by the coefficient k1 and the invisible light luminance signal Y2 multiplied by the coefficient k2 are added by an adder 53 to generate the synthesized luminance signal Y3. The above operations performed by the multipliers 51, 52, and the adder 53 is shown by Equation (1). The synthesized luminance signal Y3 is output as a color image signal along with the color signals R, G, and B.

$$Y3 = k1 \times Y1 + k2 \times Y2 \tag{1}$$

In addition, FIG. 5 shows a schematic view in which the color signals R, G, and B sent from the color signal extraction unit 13 are converted into color difference signals Cb and Cr by a color difference generation unit 54. The conversion is performed with the use of Equations (1) to (3). As a result of this conversion, the color image signal can be output as a color image signal in a YCbCr format in which a luminance signal Y and color signals Cb and Cr are used.

$$Y = 0.257R + 0.504G + 0.098B + 16 \tag{2}$$

$$Cb = -0.148R - 0.291G + 0.439B + 128 \tag{3}$$

$$Cr = 0.439R - 0.368G - 0.071B + 128 \tag{4}$$

Figure 6:
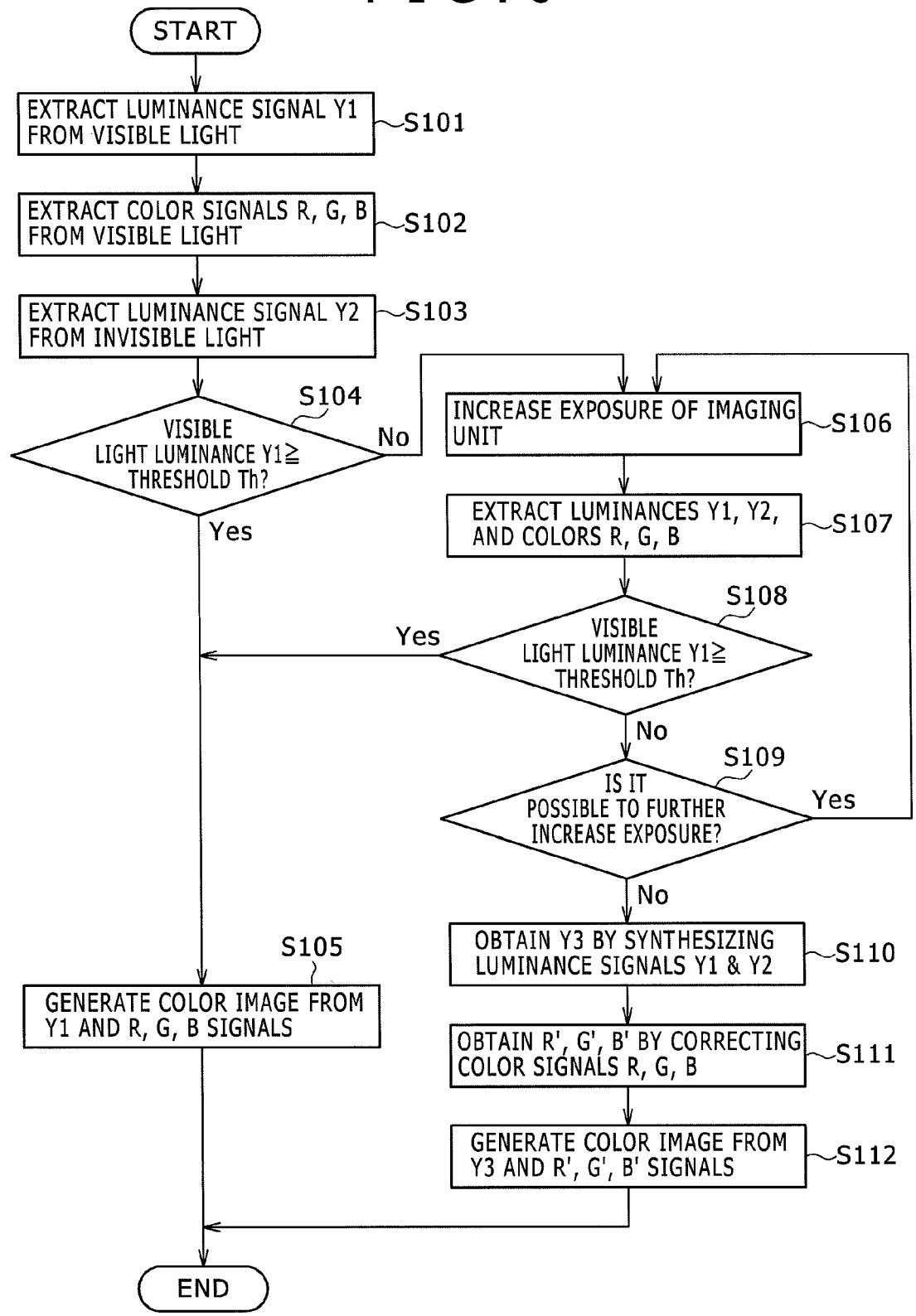
FIG. 6 is a flowchart showing the flow of generating a color image.

FIG. 6 is a flowchart showing the flow of generating a color image according to this embodiment. The following processing steps are performed by the directions of the control unit 17.

At step S101, the visible light luminance extraction unit 14 extracts a visible light luminance signal Y1 from a visible light signal.

At step S102, the color signal extraction unit 13 extracts color signals R, G, and B from the visible light signal.

At step S103, the invisible light luminance extraction unit 15 extracts an invisible light luminance signal Y2 from an invisible light signal.

In addition, it is conceivable that the above processing steps at steps S101 to S103 are not performed in accordance with the request from the control unit 17, but are performed in such a way that the color signal extraction unit 13, the visible light luminance extraction unit 14, and the invisible light luminance extraction unit 15 respectively extract the color signals and the luminance signals at predefined intervals, temporarily store these extracted signals in a memory (not shown), and the control unit 17 reads out the color signals and the luminance signals stored in the memory to perform the above processing steps.

At step S104, the control unit 17 judges whether the value of the visible light luminance signal Y1 obtained from the visible light luminance extraction unit 14 is equal to or larger than a predefined threshold Th or not. Here, the threshold Th is determined on the basis of an illuminance environment (a luminance level) necessary for generating a color image from only the visible light signal. If the judgment is Yes (Y1≥Th), because sufficient illuminance is obtained, the flow proceeds to step S105. If the judgment is No (Y1<Th), because sufficient illuminance is not obtained, the flow proceeds to step S106.

At step S105, the color signal extraction unit 13 does not perform the correction of the color signals R, G, and B, and the image synthesis unit 16 generates a color image with the use of the color signals R, G, and B, and the visible light luminance signal Y1.

At step S106, in order to compensate for the shortage of the illuminance (the shortage of the magnitudes of the color signals R, G, and B), the control unit 17 controls the imaging unit 11 so that the imaging unit 11 increases the incident amount of the visible light signal by increasing its exposure in accordance with the value of the visible light luminance signal Y1. The detail of control over the exposure of the imaging unit 11 will be described later with reference to FIG. 7.

At step S107, the visible light luminance signal Y1, the invisible light luminance signal Y2, and the color signals R, G, and B that have been changed by the control over the exposure performed at step S106 are respectively extracted by the visible light luminance extraction unit 14, the invisible light luminance extraction unit 15, and the color signal extraction unit 13.

At step S108, it is judged whether the visible light luminance signal Y1 obtained at step S107 is equal to the predefined threshold Th or larger. This judgment is made in a similar way to the judgment made at step S104. If the judgment is Yes (Y1≥Th), because a sufficient illumination is obtained, the flow proceeds to step S105. If the judgment is No (Y1<Th), because the sufficient illumination is not obtained, the flow proceeds to step S109.

At step S109, it is judged whether the imaging unit 11 can further increase the exposure or not. If the judgment is Yes (the exposure can be further increased), the control unit 17 controls the imaging unit 11 so that the imaging unit 11 further increases its exposure. If the judgment is No (the exposure can not be increased), the flow proceeds to step S110. Here, it is conceivable the steps S106 to S109 are performed if necessary.

At step S110, the control unit 17 specifies a synthesis ratio (k1:k2) between the visible light luminance signal Y1 and the invisible light luminance signal Y2 corresponding to the value of the visible light luminance signal Y1 to the image synthesis unit 16. The image synthesis unit 16 synthesizes a luminance signal Y3 with the use of the specified synthesis ratio. The determination of the synthesis ratio will be described later with reference to FIG. 8.

At step S111, the control unit 17 directs the color signal extraction unit 13 to perform the color signal correction (amplitude amplification and color noise removal) corresponding to the visible light luminance signal Y1. The color signal extraction unit 13 corrects the color signals to obtain color signals R', G', and B' in accordance with the directions of the control unit 17, and sends the color signals R', G', and B' to the image synthesis unit 16. The processing of the color signal correction will be described later with reference to FIG. 9.

At step S112, the image synthesis unit 16 generates a color image with the use of the luminance signal Y3 and the corrected color signals R', G', and B'.

In the above-described flowchart, the luminance Y3 is synthesized with the use of the synthesis ratio between the visible light luminance signal Y1 and the invisible light luminance signal Y2, in which the synthesis ratio is changed in accordance with the value of the visible light luminance signal Y1 (at step S110), and the color signals R, G, and B are corrected (the color signals R, G, and B are amplified and the noise is removed) (at step S111). Thanks to the above steps, a more natural color of an object can be generated, and a color image with good visibility can be generated. In addition, if the visible light luminance signal Y1 is smaller than the predefined threshold Th, the visible light signal that is sent from the imaging unit 11 to the image processing unit 12 can be increased by increasing the exposure of the imaging unit 11 (at step S106). Here, it is also all right if the processing at step S106 (increasing the exposure of the imaging unit 11) is performed when a user directs the processing to be performed.

Figure 7:
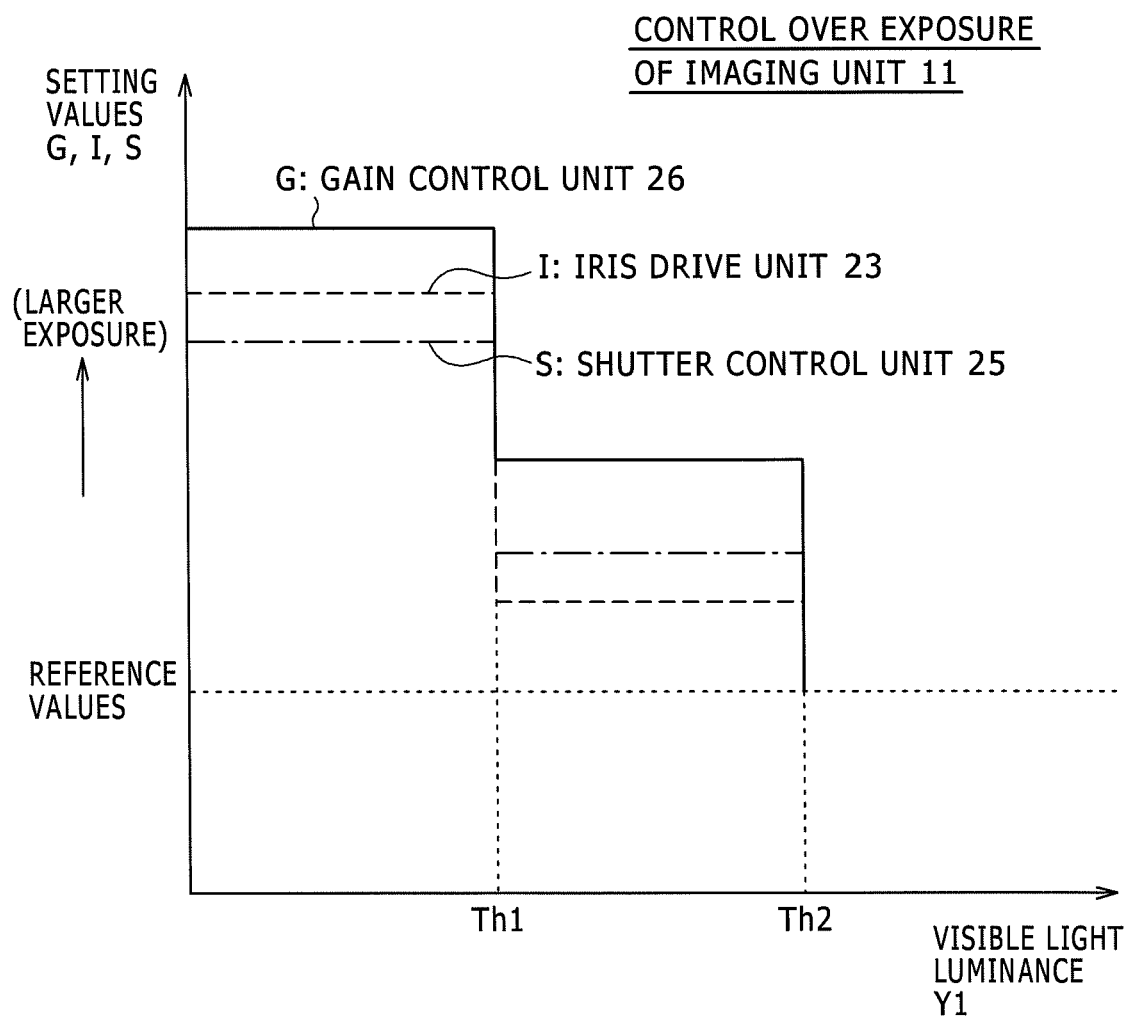
FIG. 7 is a diagram for concretely describing control over the exposure of the imaging unit (at step S106)

Hereinafter, respective pieces of processing at steps S106, S110, and S111 will be concretely described. FIG. 7 is a diagram for concretely describing control over the exposure of the imaging unit 11 (at step S106). The horizontal axis of FIG. 7 represents the intensity of the visible light luminance signal Y1, and the horizontal axis is partitioned into three sections by two thresholds Th1 and Th2 (Th1<Th2). The threshold Th2 is equivalent to the threshold Th used at step S104. These thresholds Th1 and Th2 can be values that are fixed in advance and stored by the control unit 17, or these thresholds Th1 and Th2 can be given from outside the imaging device of the present invention. The vertical axis represents exposure setting values (an iris aperture I, a shutter speed S, a signal gain G) that are set by the imaging unit 11.

The control unit 17 judges that the visible light signal input from the imaging unit 11 is large enough to generate a color image if the visible light luminance signal Y1 is equal to the threshold Th2 or larger, and does not change the exposure setting values of the imaging unit 11. (In other words, the exposure setting values remain to be reference values.)

If the visible light luminance signal Y1 is smaller than the threshold Th2, the control unit 17 judges that the visible light signal is not large enough to generate a color image, and controls an iris drive unit 23, a shutter control unit 25, and a gain control unit 26 of the imaging unit 11 so that the visible light signal is increased. In other words, the exposure setting values of the iris aperture I, the shutter speed S, and the signal gain G are changed. The above description assumes that three parameters I, S, and G are changed all at once, but it is conceivable that one or two out of these three parameters are arbitrarily selected and changed. In this embodiment, the exposure setting is performed in two ways depending on whether the visible light luminance signal Y1 is smaller than the threshold Th1 or not. An exposure amount given when the visible light luminance signal Y1 is smaller than the threshold Th1 is set larger than an exposure amount given when the visible light luminance signal Y1 is equal to the threshold Th1 or larger. In addition, setting two or more thresholds makes it possible to perform finer control over the exposure. Therefore, this finer control over the exposure prevents detail information regarding an image from being lost owing to excessive exposure (excessive amplification of the visible light signal), with the result that an appropriate visible light signal for synthesizing the color image can be sent to the image processing unit 12.

Owing to the above-described exposure processing (at step S106), the shortage of the illuminance (the shortage of the magnitude of the visible light signal) obtained by the imaging unit 11 can be corrected, and a visible light signal large enough to generate the color image can be obtained (or a visible light signal closer to the visible light signal large enough to generate the color image can be obtained).

Figure 8:
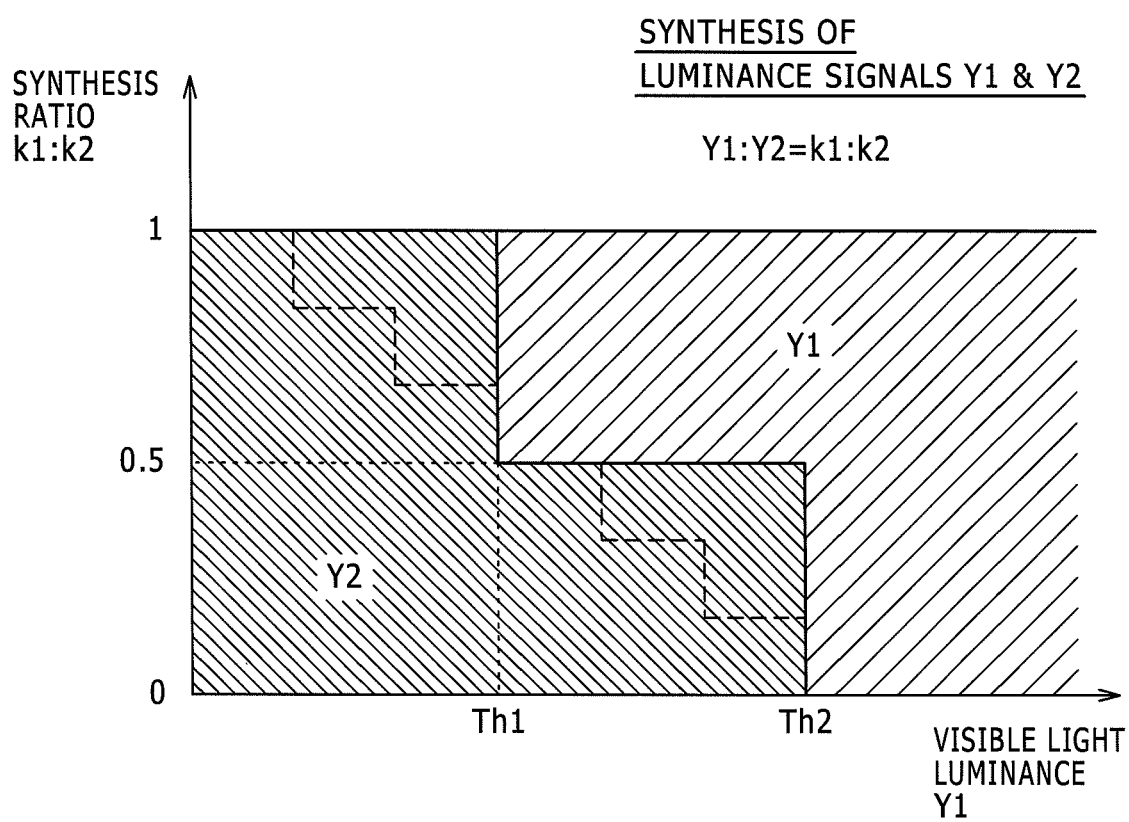
FIG. 8 is a diagram for concretely describing luminance signal synthesis performed by the image synthesis unit (at step S110)

FIG. 8 is a diagram for concretely describing luminance signal synthesis performed by the image synthesis unit 16 (at step S110). The horizontal axis of FIG. 8 represents the intensity of the visible light luminance signal Y1, and the horizontal axis is divided into three sections by two thresholds Th1 and Th2 (Th1<Th2). The threshold Th2 is equivalent to the threshold Th used at steps S104 and S108. The vertical axis of FIG. 8 represents the synthesis ratio (k1:k2) between the visible light luminance signal Y1 and the invisible light luminance signal Y2 with the use of the vertical widths of areas Y1 and Y2.

The control unit 17 determines the synthesis ratio (k1:k2) between the visible light luminance signal Y1 and the invisible light luminance signal Y2 in accordance with the value of the visible light luminance signal Y1. If the visible light luminance signal Y1 is equal to Th2 or larger, it is judged that the visible light signal input from the imaging unit 11 is large enough to generate a color image using the visible light signal, therefore k1 is set to 1, and k2 is set to 0, and the image synthesis unit 16 uses the visible light luminance signal Y1 as it is as the synthesized luminance signal Y3.

If the visible light luminance signal Y1 is smaller than Th2, the control unit 17 judges that the visible light signal is not large enough to be used for generating a color image, and the visible light luminance signal Y1 and the invisible light luminance signal Y2 is added to synthesize the synthesized luminance signal Y3 in the image synthesis unit 16. In this embodiment, this region (Y1<Th2) is partitioned into two regions by a threshold Th1. In the region where the visible light luminance signal Y1 is between Th1 and Th2, both k1 and k2 are set to 0.5. In other words, the average of the visible light luminance signal Y1 and the invisible light luminance signal Y2 is used as the synthesized luminance signal Y3. In the region where the visible light luminance signal Y1 is smaller than Th1, k1 is set to 0, and k2 is set to 1. In other words, the invisible light luminance signal Y2 is used as it is as the synthesized luminance signal Y3.

In this embodiment, although the horizontal axis representing the intensity of the visible light luminance signal Y1 is partitioned into three regions for convenience of explanation, it is conceivable that the horizontal axis is partitioned into four or more regions by setting three or more thresholds and a synthesis ratio is allocated to each region as shown by broken line segments. Therefore, the synthesis ratio determined as above prevents a part of luminance information regarding an image from being lost owing to the excessive use of the invisible light signal, which enables the image synthesis unit 16 to generate a color image with the use of an appropriate luminance signal.

Thanks to the above-described luminance synthesis processing (at step S110), even if the shortage of the illuminance (the shortage of the magnitude of the visible light signal) is not resolved in the imaging unit 11, a luminance signal necessary to generate a color image can be obtained.

Figure 9:
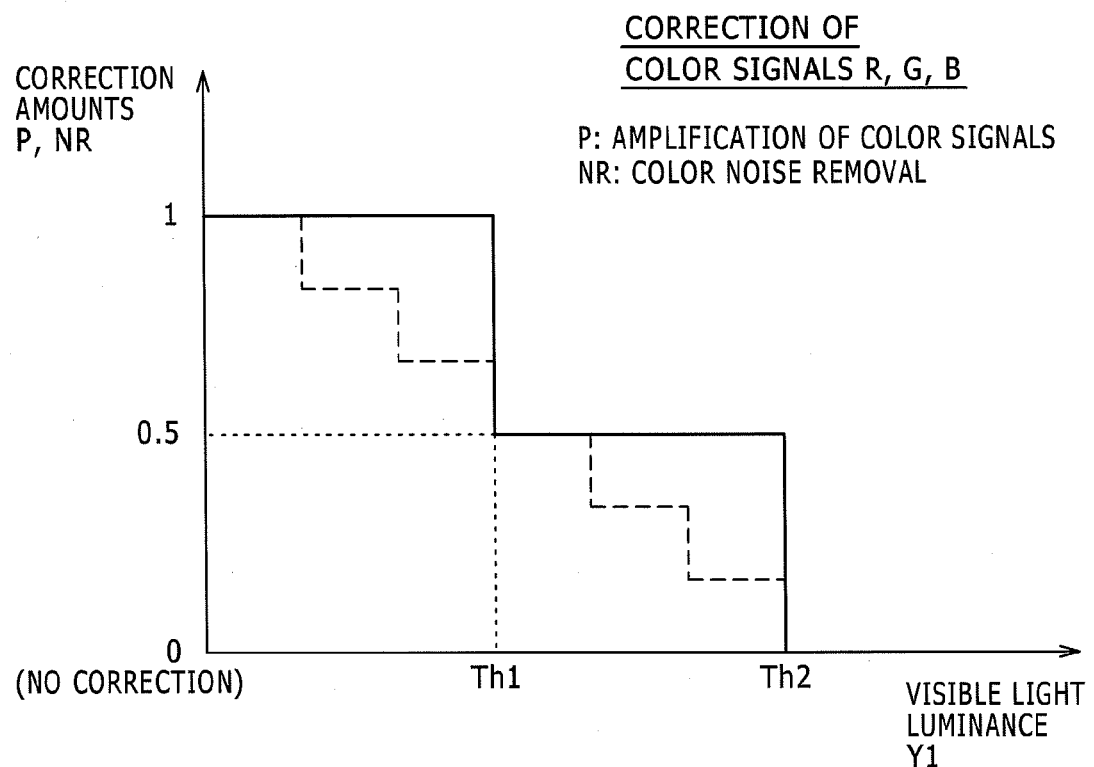
FIG. 9 is a diagram for concretely describing color signal correction performed by a color signal extraction unit (at step S111)

FIG. 9 is a diagram for concretely describing color signal correction performed by the color signal extraction unit 13 (at step S111). The horizontal axis of FIG. 9 represents the intensity of the visible light luminance signal Y1, and the horizontal axis is partitioned into three sections by two thresholds Th1 and Th2 (Th1<Th2). The threshold Th2 is equivalent to the threshold Th used at step S104. The vertical axis represents the correction amount of the color signals R, G, and B, that is, the amplification amount of the color signals P or the removal amount of the color noise NR.

In accordance with the visible light luminance signal Y1, the control unit 17 directs the color signal extraction unit 13 to perform the color signal correction. The control unit 17 judges that the visible light signal input from the imaging unit 11 is large enough to generate a color image if the visible light luminance signal Y1 is equal to the threshold Th2 or larger, and does not perform the correction of the color signals R, G, and B.

If the visible light luminance signal Y1 is smaller than the threshold Th2, the control unit 17 judges that the visible light signal is not large enough to generate a color image, and specifies the amplification amount of the color signals P and the removal amount of the color noise NR to the color signal extraction unit 13. Because this color signal correction is performed in order to cover the shortage of the visible light luminance signal Y1 shown in FIG. 8, it is desirable that the correction amount of the color signals should be increased in accordance with the synthesis ratio k2 of the invisible light luminance signal Y2 shown in FIG. 8. In the amplification of the color signals, the color signals R, G, and B are amplified by the specified amplification amount P. It will be assumed that color signals R', G', and B' are obtained as a result. Alternatively, in the case where color difference signals Cb and Cr is used instead of the color signals R', G', and B', it is necessary to change coefficients of R, G, and B of Equations (3) and (4) in accordance with the specified amplification amount P. Because the color noise removal is performed in order to suppress the increase of the color noise owing to the amplification of the color signals, the intensity of filtering processing is increased in accordance with the removal amount of the color noise associated with the amplification of the color signals.

In this embodiment, two different values are given to the correction amount of the color signals depending on the relation between the visible light luminance signal Y1 and the threshold Th1. In the case where the visible light luminance signal Y1 is smaller than the threshold Th1, a larger value of the correction amount (P or NR) is given than in the case where the visible light luminance signal Y1 is equal to the threshold Th1 or larger. It is conceivable that the horizontal axis is partitioned into four or more regions by setting three or more thresholds and a correction amount is allocated to each region as shown by broken line segments. With the above-described processing, unnecessary color noise owing to the excessive amplification of the color signals can be prevented from occurring, and appropriate color signals for synthesizing a color image can be sent to the image processing unit 12. In the above description of this embodiment, although the threshold values are used for both amplification amount of the color signals P and removal amount of the color noise NR in common, it is conceivable that the threshold values for the amplification amount of the color signals P and the threshold values for the removal amount of the color noise NR are set different from each other.

Thanks to the above-described color signal correction (at step S111), even if the shortage of the illuminance (the shortage of the magnitude of the visible light signal) is not resolved in the imaging unit 11, a color signal necessary to generate a color image can be obtained.

According to the first embodiment, the luminance Y3 is synthesized with the use of the synthesis ratio between the visible light luminance signal Y1 and the invisible light luminance signal Y2, in which the synthesis ratio is changed in accordance with the value of the visible light luminance signal Y1. In addition, the amplification of the color signals R, G, and B extracted from the visible light signal and the color noise removal is performed in accordance with the value of the visible light luminance signal Y1 extracted from the visible light signal, with the result that the color signal R', G', and B' are obtained. With the use of the synthesized luminance signal Y3 and the color signals R', G', and B', a more natural color of an object can be generated even in a low illuminance environment, and the color image of the object with good visibility can be generated.

Second Embodiment

In the above-described first embodiment, the visible light luminance signal Y1 and the invisible light luminance signal Y2 are synthesized in accordance with the value of the visible light luminance signal Y1 extracted from the visible light signal, and the correction of the color signals R, G, and B is performed. On the other hand, the second embodiment is configured in such a way that the synthesis of a luminance signal and color signal correction are performed in accordance with the exposure setting condition of the imaging unit 11. This configuration is adopted because there is a correlation between the value of an extracted visible light luminance signal Y1 and the exposure setting condition of the imaging unit 11 as shown by, for example, the fact that a camera is set to increase its exposure in a low illuminance (a low luminance) environment.

Figure 10:
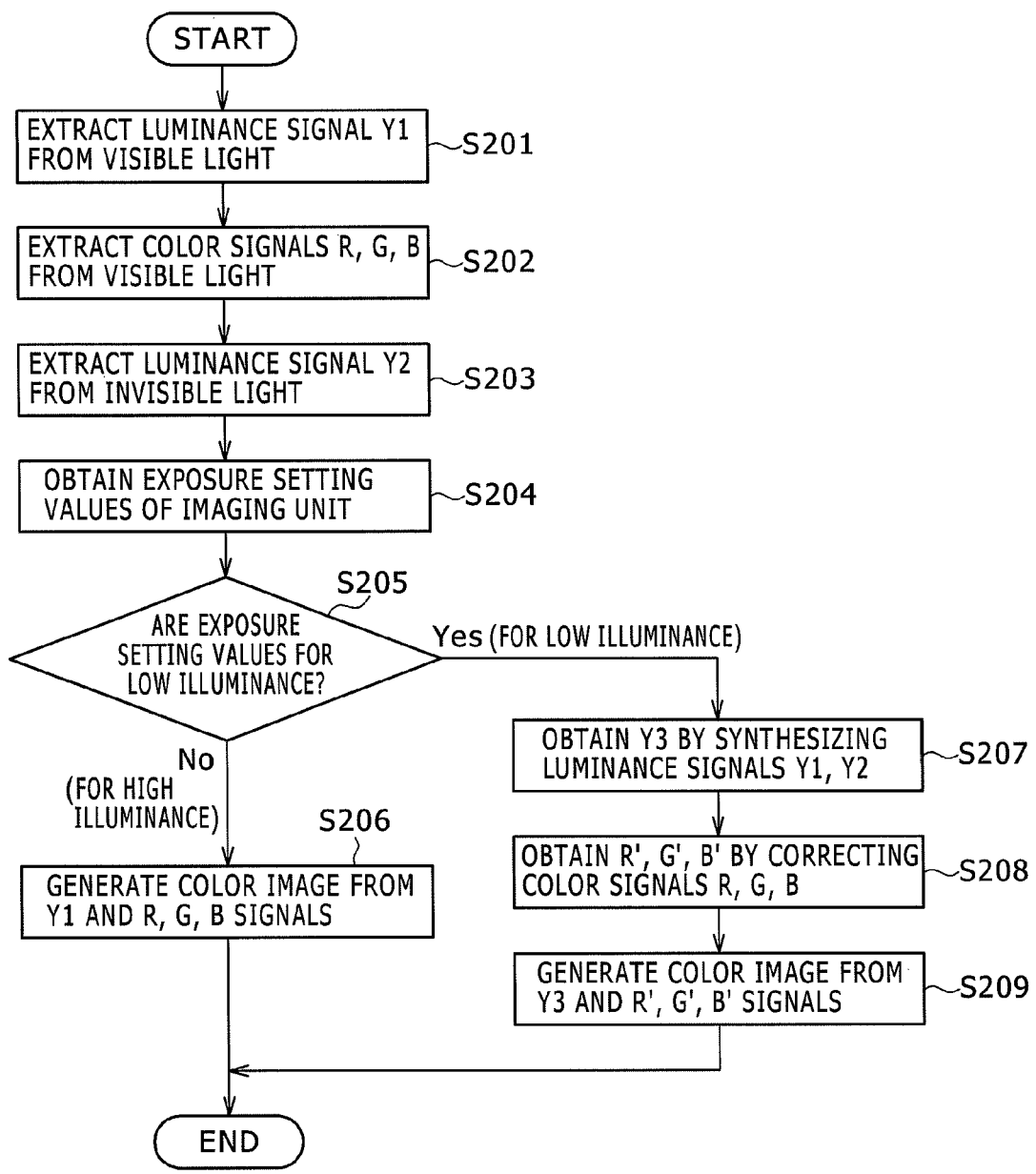
FIG. 10 is a flowchart showing the flow of generating a color image according to a second embodiment.

FIG. 10 is a flowchart showing the flow of generating a color image according to the second embodiment. The following processing steps are performed by the directions of the control unit 17.

At step S201, the visible light luminance extraction unit 14 extracts the visible light luminance signal Y1 from a visible light signal.

At step S202, the color signal extraction unit 13 extracts color signals R, G, and B from the visible light signal.

At step S203, the invisible light luminance extraction unit 15 extracts a invisible light luminance signal Y2 from an invisible light signal.

In addition, it is conceivable that the above processing steps at steps S201 to S203 are not performed in accordance with the request from the control unit 17, but are performed in such a way that the color signal extraction unit 13, the visible light luminance extraction unit 14, and the invisible light luminance extraction unit 15 respectively extract the color signals and the luminance signals at predefined intervals, temporarily store these extracted signals in a memory (not shown), and the control unit 17 reads out the color signals and the luminance signals stored in the memory to perform the above processing steps.

At step S204, the control unit 17 obtains exposure setting values from the iris drive unit 23, the shutter control unit 25, and the gain control unit 26 included by the imaging unit 11. These setting values include an iris aperture, a shutter speed, and a signal gain.

At step S205, it is judged whether the exposure setting values of the imaging unit 11 are appropriate for photographing in a low illuminance environment or not. This judgment is made on the basis of whether a good color image can be generated from only the visible light signal or not. If the judgment is Yes (the exposure setting is appropriate for photographing in a low illuminance environment), because it is judged that the illuminance is insufficient, the flow proceeds to step S207. If the judgment is No (the exposure setting is appropriate for photographing in a high illuminance environment), because it is judged that the illuminance is sufficient, the flow proceeds to step S206. Here, when the exposure setting is appropriate for photographing in an ordinary illuminance environment, it is judged that the illuminance is sufficient, therefore the judgment becomes No (the exposure setting is appropriate for photographing in a high illuminance environment). A concrete example of the judgment processing will be explained with reference to FIG. 11A and FIG. 11B, in which the judgment is made on the basis of a total exposure judgment value E that is the sum of respective exposure setting values.

At step S206, the color signal extraction unit 13 does not perform the correction of the color signals R, G, and B, and the image synthesis unit 16 generates a color image with the use of the color signals R, G, and B, and the visible light luminance signal Y1.

At step S207, the control unit 17 specifies a synthesis ratio (k1:k2) between the visible light luminance signal Y1 and the invisible light luminance signal Y2 corresponding to the total exposure judgment value E to the image synthesis unit 16. The image synthesis unit 16 synthesizes a luminance signal Y3 with the use of the specified synthesis ratio.

At step S208, the control unit 17 directs the color signal extraction unit 13 to perform the color signal correction (amplitude amplification and color noise removal) corresponding to the total exposure judgment value E. The color signal extraction unit 13 corrects the color signals to obtain color signals R', G', and B' in accordance with the directions of the control unit 17, and sends the color signals R', G', and B' to the image synthesis unit 16. The determination of the synthesis ratio and the processing of the color signal correction will be described later with reference to FIG. 11A and FIG. 11B.

At step S209, the image synthesis unit 16 generates a color image with the use of the luminance signal Y3 and the corrected color signals R', G', and B'.

In the above flowchart, the exposure setting values of the iris drive unit 23, the shutter control unit 25, and the gain control unit 26 of the imaging unit 11 are obtained. If these setting values are appropriate for photographing in a low illuminance environment, the luminance signal Y3 is synthesized after changing the synthesis ratio between the visible light luminance signal Y1 and the invisible light luminance signal Y2 (at step S207), and the visible light color signals R, G, and B are corrected (the amplification of the color signals and the color noise removal are performed) (at step S208). Thanks to the above processing, a more natural color of an object can be generated, and a color image with good visibility can be generated.

FIG. 11A and FIG. 11B are diagrams for concretely describing the judgment of the exposure setting values (at step S205), and the luminance signal synthesis corresponding to the judgment (at step S207) and the color signal correction corresponding to the judgment (at step S208). The control unit 17 obtains the iris aperture I, the shutter speed S, and the signal gain G, which are respectively the exposure setting values of the iris drive unit 23, the shutter control unit 25, and the gain control unit 26 of the imaging unit 11, from these units respectively.

FIG. 11A is a diagram showing a method for calculating exposure judgment values respectively corresponding to the exposure setting values I, S, and G. Functions f(I), g(S), and h(G) are respectively used for calculating the exposure judgment values corresponding to the exposure setting values I, S, and G, and these functions return larger values as the exposure setting values are set for photographing in a lower illuminance environment. In other words, as the iris aperture I is larger, the shutter speed is slower, and the signal gain is larger, the functions return larger values. Here, for convenience of explanation, it will be assumed that the functions return the exposure judgment values 1 when the exposure setting values I, S, and G are equal to respective thresholds or larger, and return the exposure judgment values 0 when the exposure setting values I, S, and G are smaller than respective thresholds.

Next, a total exposure judgment value E is obtained by summing up the calculated exposure judgment values f(I), g(S), and h(G) with the use of Equation (5). In this embodiment, the total exposure judgment value E becomes any one of 0, 1, 2, and 3. The total exposure judgment value E is an index showing the magnitude of the total exposure of the imaging unit 11, and the synthesis of the luminance signal and the color signal correction are performed in accordance with the total exposure judgment value E.

$$\text{Total exposure judgment value } E = f(I) + g(S) + h(G) \quad (5)$$

FIG. 11B shows an example of relationship among the total exposure judgment value E, the synthesis ratio between the luminance signals, and the color signal correction. In the case where the total exposure judgment value E=0, the exposure setting values are for photographing in a high illuminance environment, therefore it is judged that an incident visible light signal is sufficiently large. In this case, the synthesis ratio (k1:k2) used by the image synthesis unit 16 is set in such a way that k1=1 and K2=0, and the image synthesis unit 16 uses the visible light luminance signal Y1 as it is as the synthesized luminance signal Y3. In addition, the color signal correction by the color signal extraction unit 13 is not performed.

In the case where the total exposure judgment value E=1 or larger, it is judged that the incident visible light is not large enough to generate a color image. In the case where E=1, the synthesis ratio between the luminance signals are set in such a way that k1=0.7 and k2=0.3, and the synthesized luminance signal Y3 is synthesized by adding the visible light luminance signal Y1 and invisible light luminance signal Y2. In this case, the color signal correction is not performed. In the case where E=2, the synthesis ratio between the luminance signals are set in such a way that k1=0.3 and k2=0.7. In other words, the ratio of the invisible light luminance signal Y2 is increased. In this case, the color signal correction (the amplitude amplification and the color noise removal) is performed, and the color signals R, G, and B are changed into the color signals R', G', and B' by the color signal correction. In the case where E=3, the synthesis ratio between the luminance signals are set in such a way that k1=0 and k2=1. In other words, only the invisible light luminance signal Y2 is employed as the synthesis luminance signal Y3. In this case, the color signal correction is performed.

In the above example, although any of four values, that is, any of 0, 1, 2, and 3 is assigned to the total exposure judgment value E, and the synthesis of the luminance signal Y3 and the color signal correction are performed, performing meticulous control by giving a greater variety of values to the total exposure judgment value E makes it possible that an image, which is more adapting to the corresponding photographing environment and has better visibility, is generated.

In the second embodiment, whether the illuminance of the current photographing environment is sufficiently large or not is judged from the exposure setting values of the imaging unit 11. Therefore, in the case of the second embodiment, it is not necessary to make the judgment with the use of the visible light luminance signal Y1 extracted from the visible light signal, which is different from in the case of the first embodiment. As a result, in the second embodiment, it can be judged whether the illuminance is insufficient or not more easily in comparison with in the first embodiment.

Third Embodiment

In the above-described first and second embodiments, the imaging unit is configured as one optical system, and a visible light signal and an invisible light signal are output from the common imaging pixels. On the other hand, in a third embodiment, an imaging unit includes two optical systems, and a visible light signal and an invisible light signal are respectively output from the imaging pixels of different optical systems.

Figure 12:
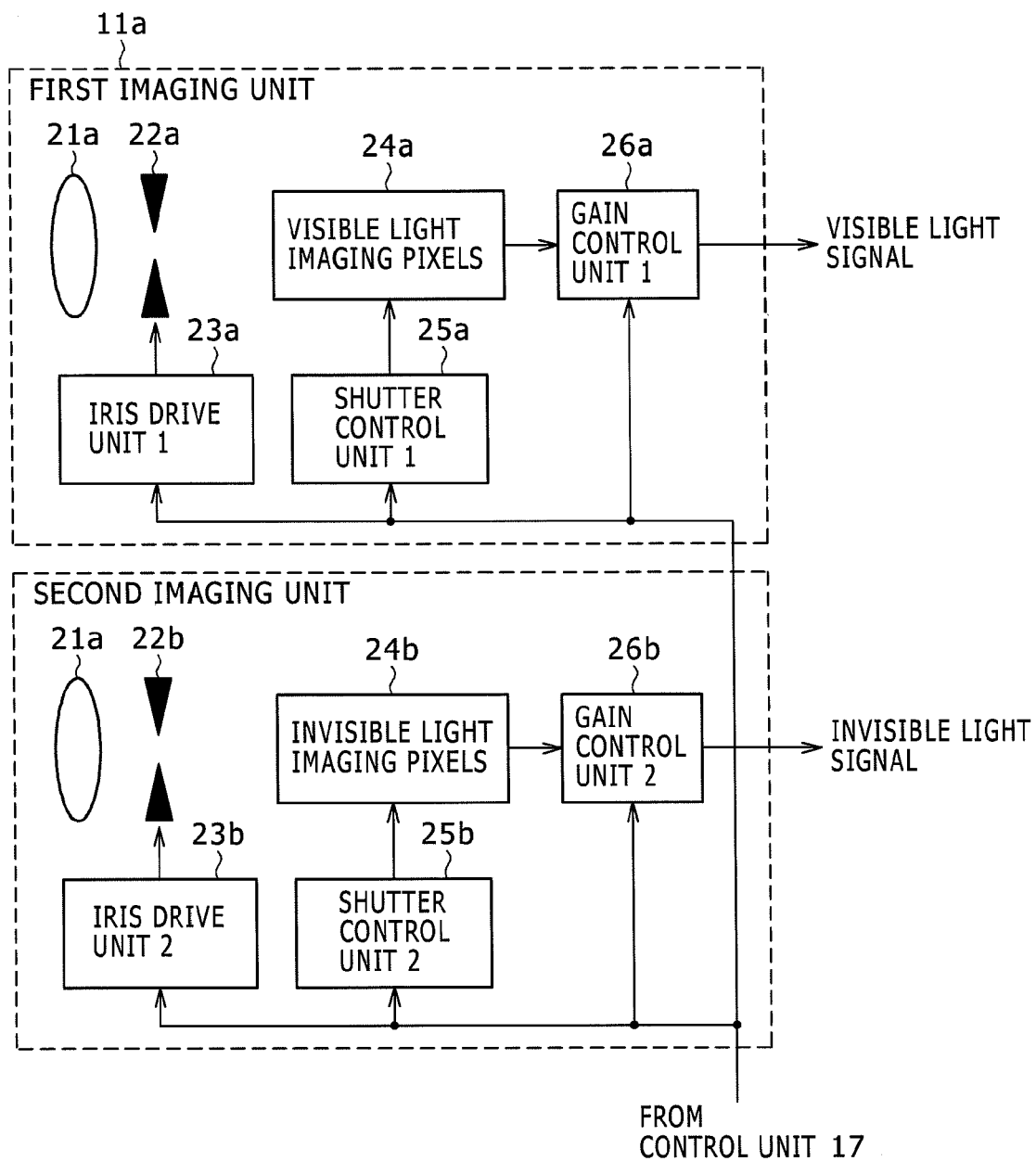
FIG. 12 is a diagram showing the internal configuration of an imaging unit according to a third embodiment.

FIG. 12 is a diagram showing the internal configuration of an imaging unit according to the third embodiment. This embodiment includes two imaging units 11a and 11b, and the imaging unit 11a is used for visible light, and the imaging unit 11b is used for invisible light. The imaging unit 11a for visible light includes: a lens 21a; an iris 22a; an iris drive unit 23a; visible light imaging pixels 24a; a shutter control unit 25a; and a gain control unit 26a. The imaging unit 11b for invisible light includes: a lens 21b; an iris 22b; an iris drive unit 23b; invisible light imaging pixels 24b; a shutter control unit 25b; and a gain control unit 26b. The visible light imaging pixels 24a includes R, G, and B pixels, and the invisible light imaging pixels 24b includes IR pixels. The gain control unit 26a of the imaging unit 11a outputs a visible light signal, and the gain control unit 26b of the imaging unit 11b outputs an invisible light signal.

The iris drive units 23a and 23b, the shutter control units 25a and 25b, and the gain control units 26a and 26b are controlled by the control unit 17. In addition, when any of the setting values of the iris drive units 23a and 23b, the shutter control units 25a and 23b, and the gain control units 26a and 26b for the operation of the imaging units 11a and 11b is changed, the unit corresponding to the changed setting value sends its setting value to the control unit 17.

In the third embodiment, the exposure settings (iris apertures, shutter speeds, and signal gains) for the visible light and the invisible light can be respectively and optimally controlled. Therefore, when both visible light signal and invisible light signal are used in a low illuminance environment, a color image with good visibility can be generated.

The present invention is not limited to the above embodiments, and includes various modifications without departing from the spirit and scope thereof. For example, the above embodiments have been described in detail for a comprehensive explanation of the present invention, and it is not always necessary for each embodiment to include all its configuration components. In addition, in the above-described embodiments, a part of configuration of one embodiment may be replaced with a part of configuration of another embodiment, and a part of configuration of one embodiment may be added to the configuration of another embodiment. In addition, a part of configuration of one embodiment may be deleted.

In addition, a part or the entirety of configuration of each of the above-described embodiments can be realized by hardware, or can be realized by programs executed by a processor. In addition, control lines and signal lines considered to be necessary for explanation are shown in the above-described embodiments, and all the control lines and signal lines necessary for the imaging device to operate as a product are not shown. In reality, it is conceivable that all the configuration components shown in the above-described embodiments are coupled to each other.

What is claimed is:

1. An imaging device that generates a color image through photographing an object, comprising:
   an imaging unit that photographs an object, receives visible light and invisible light using imaging pixels, and converts the received visible light and invisible light into a visible light signal and an invisible light signal;
   a visible light luminance extraction unit that extracts a visible light luminance signal Y1 from the visible light signal;
   an invisible light luminance extraction unit that extracts an invisible light luminance signal Y2 from the invisible light signal;
   a color signal extraction unit that extracts color signals from the visible light signal and for correcting the color signals as well;
   an image synthesis unit that synthesizes the visible light luminance signal Y1 and the invisible light luminance signal Y2 to form a synthesized luminance signal Y3 and that generates a color image using the synthesized luminance signal Y3 and the corrected color signals; and
   a control unit that controls the imaging unit, the color signal extraction unit, and the image synthesis unit,
   wherein, in accordance with the value of the visible light luminance signal Y1 extracted in the visible light luminance extraction unit, the control unit controls a synthesis ratio between the visible light luminance signal Y1 and the invisible light luminance signal Y2 used for the synthesis performed in the image synthesis unit, a gain for the color signals to be corrected in the color signal extraction unit, and color noise removal to be performed in the color signal extraction unit.

2. The imaging device according to claim 1, wherein the control unit controls the image synthesis unit so that the image synthesis unit uses the visible light luminance signal Y1 as the synthesized luminance signal Y3 when the value of the visible light luminance signal Y1 is equal to a threshold Th2 or larger, and uses the invisible light luminance signal Y2 as the synthesized luminance signal Y3 when the value of the visible light luminance signal Y1 is smaller than a threshold Th1 (where Th1<Th2).

3. The imaging device according to claim 1, wherein control unit controls the color signal extraction unit so that the color signal correction is not performed when the value of the visible light luminance signal Y1 is equal to a threshold Th2 or larger, and the amplification of the color signals and color noise removal are performed in accordance with the synthesis ratio of the invisible light luminance signal Y2 when the value of the visible light luminance signal Y1 is smaller than the threshold Th2.

4. The imaging device according to claim 1,
   wherein, in order to set an exposure condition, the imaging unit includes:
   an iris drive unit that adjusts an iris aperture;
   a shutter control unit that controls the shutter speed for the imaging pixels; and a gain control unit that amplifies signals obtained by the imaging pixels, and wherein the control unit controls the imaging unit so that the imaging unit changes the setting values of the iris aperture, the shutter speed, and the signal gain, and increases exposure when the value of the visible light luminance signal Y1 is smaller than the threshold Th2.

5. An imaging device for generating a color image through photographing an object, comprising:

an imaging unit that photographs an object, receives visible light and invisible light using imaging pixels, and converts the received visible light and invisible light into a visible light signal and an invisible light signal;

a visible light luminance extraction unit that extracts a visible light luminance signal Y1 from the visible light signal;

an invisible light luminance extraction unit that extracts an invisible light luminance signal Y2 from the invisible light signal;

a color signal extraction unit that extracts color signals from the visible light signal and that corrects the color signals as well;

an image synthesis unit that synthesizes the visible light luminance signal Y1 and the invisible light luminance signal Y2 to form a synthesized luminance signal Y3 and that generates a color image using the synthesized luminance signal Y3 and the corrected color signals; and a control unit that controls the imaging unit, the color signal extraction unit, and the image synthesis unit, wherein, in accordance with the exposure condition of the imaging unit, the control unit controls a synthesis ratio between the visible light luminance signal Y1 and the invisible light luminance signal Y2 used for the synthesis performed in the image synthesis unit, a gain for the color signals to be corrected in the color signal extraction unit, and color noise removal to be performed in the color signal extraction unit.

6. The imaging device according to claim 5, wherein, in order to set an exposure condition, the imaging unit includes:

an iris drive unit that adjusts an iris aperture;

a shutter control unit that controls the shutter speed for the imaging pixels; and a gain control unit that amplifies signals obtained by the imaging pixels, wherein the control unit calculates an exposure judgment value using the setting values of the iris aperture, the shutter speed, and the signal gain in the imaging unit, and controls the synthesis ratio between the luminance signals and the correction of the color signals in accordance with the exposure judgment value.

7. The imaging device according to claim 1, wherein the imaging unit includes:

a visible light imaging unit including imaging pixels that output the visible light signal; and an invisible light imaging unit including imaging pixels that output the invisible light signal.

8. The imaging device according to claim 1, wherein the imaging pixels of the imaging unit output a signal in the near-infrared region as the invisible light signal.

* * * * *